US008515800B2

(12) United States Patent
Huang et al.

(10) Patent No.: US 8,515,800 B2
(45) Date of Patent: Aug. 20, 2013

(54) METHOD AND SYSTEM FOR ESTIMATING RISK IN THE FINANCIAL METRICS OF A BUSINESS CASE

(75) Inventors: Pu Huang, Westchester, NY (US); Dharmashankar Subramanian, Stamford, CT (US)

(73) Assignee: International Business Machines Corporation, Armonk, NY (US)

(*) Notice: Subject to any disclaimer, the term of this patent is extended or adjusted under 35 U.S.C. 154(b) by 446 days.

(21) Appl. No.: 12/771,188

(22) Filed: Apr. 30, 2010

(65) Prior Publication Data
US 2011/0270647 A1 Nov. 3, 2011

(51) Int. Cl.
G06Q 40/00 (2012.01)

(52) U.S. Cl.
USPC ............................................. 705/7.28

(58) Field of Classification Search
USPC ............................................. 705/7.28
See application file for complete search history.

(56) References Cited

U.S. PATENT DOCUMENTS

| | | | | |
|---|---|---|---|---|
| 6,735,596 | B2* | 5/2004 | Corynen | 1/1 |
| 7,305,351 | B1* | 12/2007 | Bechhofer et al. | 705/7.28 |
| 7,552,480 | B1* | 6/2009 | Voss | 726/25 |
| 7,698,148 | B2* | 4/2010 | Lavu et al. | 705/1.1 |
| 7,769,684 | B2* | 8/2010 | Del Bianco et al. | 705/38 |
| 8,005,706 | B1* | 8/2011 | Cassone et al. | 705/7.28 |
| 8,050,993 | B2* | 11/2011 | Del Bianco et al. | 705/35 |
| 8,260,653 | B1* | 9/2012 | Osterfelt et al. | 705/7.28 |
| 8,392,323 | B2* | 3/2013 | Erdman et al. | 705/38 |
| 2010/0318395 | A1* | 12/2010 | Corneil et al. | 705/8 |

OTHER PUBLICATIONS

Yacoub and Ammar, A Methodology for Architectural-Level Reliability Risk Analysis, IEEE Transactions on Software Engineering, vol. 28, No. 6, Jun. 2002, p. 529-47.*
Goseva-Popstojanova et al., Architectural-Level Risk Analysis Using UML, IEEE Transactions on Software Engineering, vol. 29, No. 10, Oct. 2003, p. 946-959.*
Yang and Jones, Assimilation Exchange Based Software Integration, IEA/AIE 2004, LNAI 3029, 2004, p. 1229-1238.*
PriceWaterhouse Coopers, A practical guide to risk assessment, Dec. 2008, p. 1-36.*

* cited by examiner

*Primary Examiner* — Justin M Pats
(74) *Attorney, Agent, or Firm* — Scully, Scott, Murphy & Presser, P.C.; Daniel P. Morris, Esq.

(57) ABSTRACT

The system and method of the present disclosure allow the user to enumerate a set of risk factors for each financial metric time-profile projection, and respond to a set of questions that is linear in the number of risk factors. In one embodiment, the risk elicitation on each risk factor uses user input of likelihood of risk and impact and/or severity. On each of the risk factors for any given nominal, financial projection estimate, the inputs are systematically converted into a net impact distribution for that nominal, financial estimate.

5 Claims, 4 Drawing Sheets

Fig. 4

Net Relative Impact:

$$\Delta(i_1, i_2, \ldots, i_I) = 1 - \left( \prod_{k=1}^{I} (1 - \Delta_k) \right)$$

$$\forall 1 \leq I \leq K$$

Fig. 5

$$\text{Triangular Min:} = \underset{i \in \left\{ 1, 2, \ldots, \sum_{I=0}^{K} N_{C_I} \right\}}{\text{Min}} (\Delta_i^{NET})$$

$$\text{Triangular Max} = \underset{i \in \left\{ 1, 2, \ldots, \sum_{I=0}^{K} N_{C_I} \right\}}{\text{Max}} (\Delta_i^{NET})$$

$$\text{Triangular Centre} = \frac{\sum_{I=0}^{K} \sum_{i=1}^{N_{C_I}} p_i^{NET} * \Delta_i^{NET}}{\sum_{I=0}^{K} \sum_{i=1}^{N_{C_I}} p_i^{NET}}$$

Fig. 3

$K = Max\, I$ s.t.

$I \in \{1, 2, \ldots, N\}$ $$\text{Max}\left( \underset{(i_1, i_2, i_3 \ldots i_I) \in N_I}{\prod_{k=1}^{I}} p_{i_k} \right) \geq \alpha$$

where $N_I$ is the set of all subsets of cardinality I, of the set $\{1, 2, \ldots, N\}$

METHOD AND SYSTEM FOR ESTIMATING RISK IN THE FINANCIAL METRICS OF A BUSINESS CASE

FIELD OF THE INVENTION

The present disclosure relates generally to computer-implemented optimization models, and more particularly to estimating risk in the financial metrics of a business case.

BACKGROUND OF THE INVENTION

In the context of driving top-line growth, businesses develop "Business Cases". A business case includes a multi-period financial plan, in terms of a projected time-profile of all select financial metrics, such as Revenue, Gross Profit Margin, Development Expense, Sales & General Administration Expenses, etc. A business case proposal is typically built using nominal, deterministic, point-value estimates for the projected time-profiles of all select financial metrics. In order to perform a risk-adjusted portfolio analysis of a proposed set of business cases, each business case needs to be analyzed with respect to various risk factors, and the deterministic, nominal estimates of all projected financial metric time-profiles need to be converted into suitable probability distributions.

While techniques and processes exist that address the problem of business-case portfolio analysis, all of them expect the risk-information as an input into the portfolio analysis process/technique. The known techniques for risk-adjusted portfolio analysis of business cases range from requiring the user to input a risk metric score, e.g., on a scale of one to ten, for each business case, to requiring the user to input a probability distribution for each financial metric projection that is considered to be risky.

The limitation in such a requirement is that most people that prepare and propose business cases cannot directly write down a net risk metric score for the business case, or directly write down a probability distribution for describing the uncertainty in the projected financial metric time-profiles. What is needed is an analytical technique that can capture their state-of-the-art beliefs about various risk factors in a format that is easy to use, and further convert the user-inputs into a risk metric score, or appropriate probability distributions.

The problem then becomes: given a business case, which includes a multi-period financial plan, how does one arrive at risk quantification for the business case? How does one develop a risk metric score, or more generally, probability distributions that describe the uncertainty in the projected financial metric time-profiles. A solution to the problem would provide a useful and effective step for performing risk-adjusted portfolio analysis of a set of business cases. In practice, this step is often the gating step, which enables, or impedes, effective risk-adjusted portfolio analysis of business cases.

Bayesian networks address the problem of reasoning and inference based on expert beliefs on conditional probabilities of various states. They require prior probabilities to be input by the user, as well as conditional probability tables to be input by the user. Further, they do not address the above problem of developing the quantification of impact distributions that can result from a combination of risk factors. In the above context of developing risk quantification for business cases, what is needed is to develop a probability distribution of the net impact to a nominal financial metric estimate that can result from a combination of risk factors.

BRIEF SUMMARY OF THE INVENTION

A method and system for estimating risk in financial metrics of a business case are provided. In one aspect, the method may include categorizing a financial metrics into a plurality of risk factors, receiving likelihood of risk associated with each risk factor in first categorical scale, and receiving severity associated with each risk factor in second categorical scale. The method may also include converting said first categorical scale and said second categorical scale into numerical scale using a mapping, and determining a maximal threshold parameter K that represents at most K risk factors that simultaneously impact the business case with at least a threshold probability A. The method may further include determining net relative impact using an aggregation function, $$\Delta(i_1, i_2, \ldots, i_l) = 1 - \left(\prod_{k=1}^{l}(1-\Delta_k)\right) \forall\, 1 < l \le K,$$

wherein K=risk factors that can simultaneously impact a business case, and determining combinatorial subsets of the K risk factors. The method may further include determining net severity impact for the combinatorial subsets of risk factors using the aggregation function, determining risk likelihood for the combinatorial subsets, and converting the net severity impact for the combinatorial subsets and the risk likelihood for the combinatorial subsets into probability distribution.

A system for estimating risk in financial metrics of a business case, in one aspect, may include a data-driven transform module operable to transform a nominal estimate of a financial metric into a probability distribution over a range of values, and an expert-driven adjustment module operable to adjust the probability distribution using expert-opinion driven risk elicitation and estimation. The transform module determines historical error data in estimation accuracy of financial planning process using historical data, fits a triangular distribution to the historical error to characterize risk in projected forecasts, and captures risk adjusted financial metric as a triangular random variable. The expert-driven adjustment module elicits likelihood of realization of forward-looking risk factors and severity of impact for each risk factors in categorical scales, captures numerical scales calibrated by from the categorical scales, determines all combinations of all risk factors, and generates a probability distribution of net relative impact that is aggregated over each combination, where the net relative impact is relative to (i.e. over and above) the triangular distribution resulting from the "transform module".

A program storage device readable by a machine, tangibly embodying a program of instructions executable by the machine to perform a method of estimating risk in financial metrics of a business case may be also provided. The method that is performed by the machine may include transforming a nominal estimate of a financial metric into a probability distribution over a range of values; and adjusting the probability distribution using expert-opinion driven risk elicitation and estimation. The step of transforming a nominal estimate of a financial metric into a probability distribution over a range of values may include determining historical error data in estimation accuracy of financial planning process using historical data, fitting a triangular distribution to the historical error to characterize risk in projected forecasts, and capturing risk adjusted financial metric as a triangular random variable. The above historical data driven step may be also referred to as the "transform" step. The step of adjusting the above probability distribution using expert-opinion driven risk elicitation and estimation may include eliciting likelihood of realization of risk factors and severity of impact for each risk factors in categorical scales, capturing numerical scales calibrated by from the categorical scales, determining all combinations of all risk factors, generating a probability distribution of net (relative) impact that is aggregated over each combination. The method may also include combining the probability distribution of net (relative) impact with the probability distribution resulting from the "transform" step that is driven by historical data.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3 is an algorithm which determines in one embodiment, a maximal threshold parameter K<N such that at most K risk factors can simultaneously impact a portfolio element with at least a threshold probability, $\alpha$.

FIG. 4 is an aggregation function in one embodiment that computes the net relative impact (net severity), arising from a simultaneous consideration of say, M, risk factors, $1 \leq M \leq K$.

FIG. 5 illustrates a triangular distribution of risk factor combinations.

DETAILED DESCRIPTION

Figure 1:
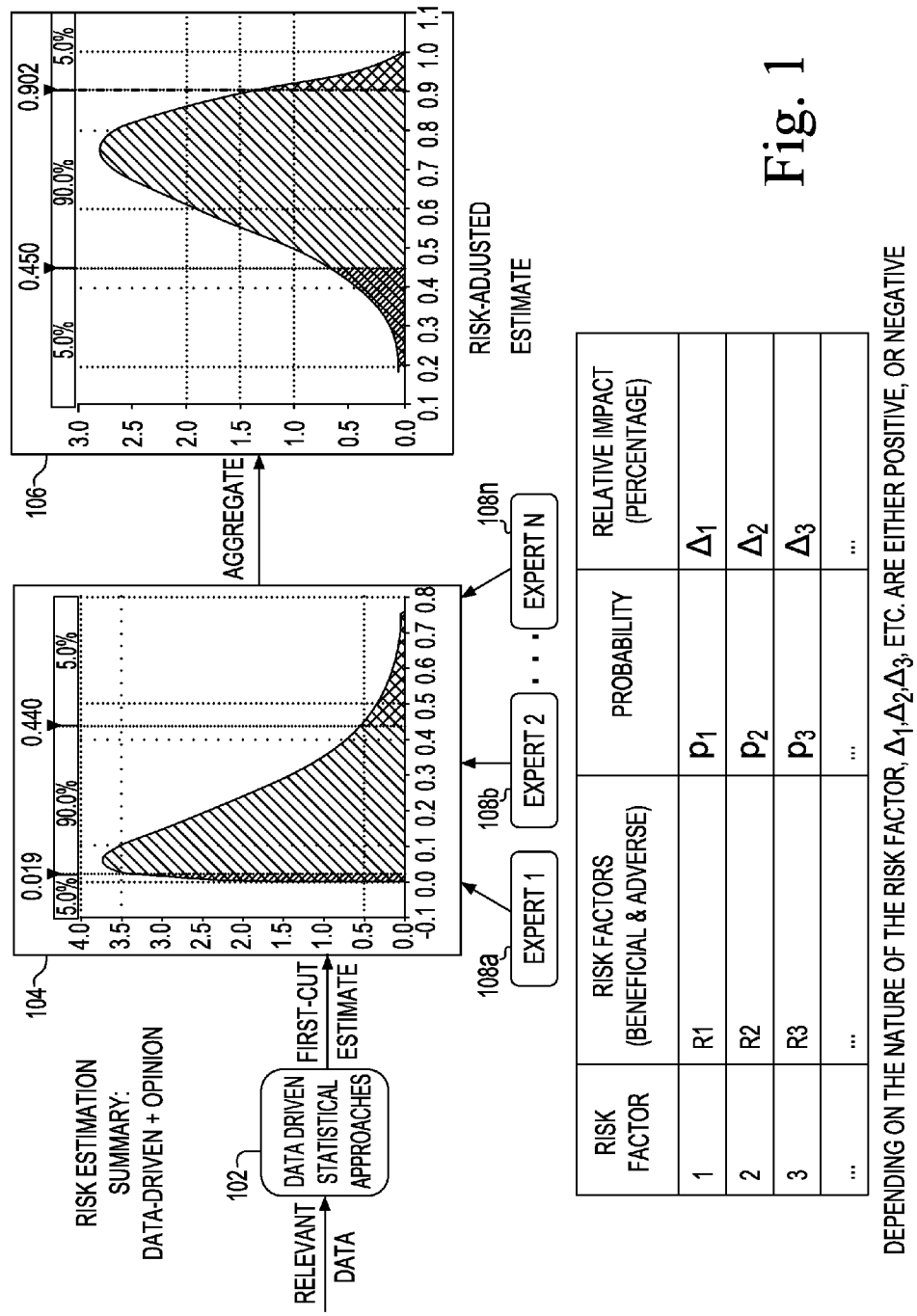
FIG. 1 illustrates risk estimation procedure of the present disclosure that includes data driven statistical approaches and expert-opinion techniques.

FIG. 1 illustrates risk estimation procedure of the present disclosure that includes data driven statistical approaches and expert-opinion techniques. The method in one embodiment of the present disclosure of estimating the probability distribution of net impact to any nominal financial metric may include the following steps:
1. Use all relevant historical data and use standard statistical techniques to estimate a data-driven impact in the form of a probability distribution shown at 102. This step transforms a nominal estimate of any financial metric into a probability distribution over a range of values.
2. Step 1 is followed by a risk elicitation and estimation step, where the method seeks expert-opinion (108a, 108b, ... 108n) to further adjust the output of Step 1 (104). This is an expert-opinion driven technique that seeks to incorporate the impact due to forward-looking risk factors that are over and above those (risk factors), which are already present in the historical data.

The present disclosure also may provide for specific data driven techniques (Step 1) for risk-adjusting nominal financial estimates of Revenue and Net Profit Margin. The present disclosure also may provide specific techniques for performing Step 2, i.e., expert-opinion driven risk elicitation and estimation. An output is the aggregated risk-adjusted estimate shown at 106.

Data-driven methods are presented, in one aspect, to risk-adjust the nominal Revenue estimate for any given business case, using plan-versus-actual historical data, as well as market opportunity data for that business case. Business cases are developed in the context of a company's brand, which might be a product or a service. In the present disclosure, market opportunity of a business case refers to the market opportunity for the corresponding product or service.

In the following description, the term "As-is" plan is used to refer to the proposed financial plan. The terms, "portfolio element" and "business case" are used interchangeably, since each business case is an element, i.e., a distinct member of the overall portfolio of business cases. A portfolio element is a grouping of multiple projects that share common descriptors such as technological characteristics, type of effort, product type, customer type, market opportunity segment, etc. A portfolio element also exhibits stable behavior in its financial metrics, and enables measurement, tracking and forecasting of these metrics with reasonable accuracy. An example of a portfolio element in the context of hardware systems development may be mainframes, for example, or high-performance computing systems for scientific computing, etc. Let the set, $I=\{1, \ldots, n\}$, denote the set of business cases. This set may partition in many ways, such as along brands, or sub-brands that belong to the company. Let $t=0$ represent the current time period. Let $T=\{1, \ldots, HF\}$ denote the planning horizon including HF time periods into the future. Let $P_i=\{-HP_i+1, \ldots, 0\}$, i$\in$I, denote the past including $HP_i$ time periods (including $t=0$) over which there is historical data for business case i (or historical data for business cases that are similar to business case i. Two business cases may be similar by virtue of targeting the same industry, or customer set, for example).

The proposed financial plan may include Revenue ($R_{i,t}$), Net Profit Margin ($\rho_{i,t}$), and Development Expense ($D_{i,t}$) and Market Opportunity ($MO_{i,t}$) for each portfolio element i$\in$I, in combination with each forward looking time period, t$\in$T (forecasted values). The historical data set may include the corresponding values (i.e., actual values) for each corresponding historical time period, t$\in$P. Note that net profit margin may be computed as the net profit divided by the corresponding revenue.

Estimate and Quantify Overall Portfolio Risk:

The proposed financial plan contains a future-looking plan for Revenue and Net Profit Margin, which is typically an aspiration that agrees with the company's financial targets. The plan may be assessed separately for the risk inherent in its attainment. A simple example of financial risk adjustment to the "As-is" plan is the use of weighted average cost of capital to discount cash flow calculations associated with the returns of different elements. This approach may ignore the individual specificities of different elements.

Another approach is to adjust each element with respect to the risk in its future forecasts, $R_{i,t}$ and $\rho_{i,t}$, i$\in$I, t$\in$T. Specifically, we seek to convert each deterministic estimate, $R_{i,t}$ and $\rho_{i,t}$, into corresponding stochastic estimates, $\tilde{R}_{i,t}$ and $\tilde{\rho}_{i,t}$. Applicable techniques range from data-driven approaches to expert-opinion-driven approaches. In each of the following techniques, we seek to develop the risk estimation for each quantity in the form of a triangular distribution. A triangular probability density is specified using three parameters, namely, the minimum value, the most likely value, and the maximum value. Such a parametric form is convenient for practitioners to understand and further modify, if they choose to, by revising any of the above three parameters that have simple interpretations. The choice of a specific probability density to capture the risk estimation has no bearing on the subsequent steps in the analysis. In other words, the techniques used in the simulation-based, overall portfolio risk quantification step, or the subsequent sample-based techniques for optimal portfolio reallocation are neutral with respect to the specific parametric choice of the probability distribution used in risk estimation.

Data Driven Approaches for Risk Estimation

1. Using Plan-Versus-Actual Historical Revenue Data

A simple data-driven approach may include examining the historical differences between "planned values" and "actual values" for each element to quantify the corresponding error in the financial planning estimates. This approach utilizes the historical "planned values" corresponding to each time period, $t \in P_i$. For example, we denote the historical planned revenue values as $PR_{i,t}$, $\forall i \in I$, $t \in J$. We can examine the historical errors in the estimation accuracy of the financial planning process. Let $\Delta_{i,t}$ denote the difference between planned and actual revenue values of element i in historical time period, $t \in P_i$.

$$\Delta_{i,t} = \frac{(R_{i,t} - PR_{i,t})}{PR_{i,t}}, \forall i \in I, t \in P_i \quad (1)$$

Fitting a triangular distribution to the historical error data from Equation (1) is one way to characterize the risk in the projected forecasts. Alternatively, if a sufficiently large historical data set is available, more sophisticated statistical techniques such as Chi-Squared test or Anderson-Darling test can be used to fit a distribution of choice. The simple approach, which also applies analogously to Net Profit margin, is in terms of a triangular probability density as follows.

$$\tilde{\Delta}_i = \text{Triangular}(a,b,c), \forall i \in I$$

$$a = \text{Min}_{t \in P_i}(\Delta_{i,t})$$

$$b = \text{Average}_{t \in P_i}(\Delta_{i,t})$$

$$c = \text{Max}_{t \in P_i}(\Delta_{i,t}) \quad (2)$$

The corresponding risk-adjusted Revenue forecast would be captured as a triangular random variable, as follows.

$$\tilde{R}_{i,t} = R_{i,t}(1+\tilde{\Delta}_i) \forall i \in I, t \in T \quad (3)$$

2. Using plan-versus-actual historical Revenue Data and Market Opportunity Data Another data-driven approach for Revenue risk estimation is the use of forward looking Market Opportunity. This begins with examining the historical Market Opportunity trend vis-à-vis historical Revenue trend for each element. The relative trend behavior is then used to assess the risk in future-looking Revenue time-profile, in the light of its future-looking Market Opportunity time-profile.

Let $\delta_{MO,i,P_i}$ and $\delta_{R,i,P_i}$ represent respectively the compound-growth-rate of Market Opportunity and Revenue over the historical interval, $[-HP_i+1,0]$, for element i. The relative difference between these growth trends is given as, $$\varepsilon_i = \frac{\delta_{MO,i,P_i} - \delta_{R,i,P_i}}{|\delta_{MO,i,P_i}|} \quad (4)$$

Let $T_0 = \{0, 1, \ldots, HF\}$, i.e., the portfolio planning horizon T augmented with the current time period, $t=0$. A risk-aware compound-growth-rate of forward looking revenue, relative to $t=0$, is computed as, $$\tilde{\delta}_{R,i,T_0} = \delta_{MO,i,T_0} - |\delta_{MO,i,T_0}|\varepsilon_i \quad (5)$$

Note that $\delta_{MO,i,T_0}$ and $\delta_{R,i,T_0}$ have analogous definitions over the time-interval spanned by set $T_0$ in Equation (5). This equation is obtained by assuming that the historically witnessed error $\varepsilon_i$ will continue into the future. The resulting risk-adjustment to the Revenue forecast is captured as a triangular distribution.

$$\tilde{R}_{i,t} = \text{Triangular}(a,b,c), \forall i \in I, t \in T$$

$$a = \text{Min}(R_{i,t=0}(1+\tilde{\delta}_{R,T_0})^t, R_{i,t})$$

$$b = \text{Either } a, \text{ or, } c \text{ (chosen by expert)}$$

$$c = \text{Max}(R_{i,t=0}(1+\tilde{\delta}_{R,T_0})^t, R_{i,t}) \quad (6)$$

A similar exercise as Equations (2) and (3) will lead to a triangular distribution for net profit margin forecast, $\tilde{\rho}_{i,t}$, $\forall i \in I$, $t \in T$. Alternatively, we can take the historical average of the Net Profit Margins in each element as one extremity of a range of possible margins, while the future forecasted value is the other extremity of the range. We can posit a triangular distribution over this range, by asking an expert to choose either extremity as the most likely value of the distribution. In this approach, the risk-adjusted net profit margin takes the form, $$\tilde{\rho}_{i,t} = \text{Triangular}(a,b,c), \forall i \in I, t \in T$$

$$a = \text{Min}(\text{Average}_{\tau \in P_i}(\rho_{i,\tau})\rho_{i,t})$$

$$b = \text{Either } a, \text{ or, } c \text{ (chosen by expert)}$$

$$c = \text{Max}(\text{Average}_{\tau \in P_i}(\rho_{i,\tau})\pi_{i,t}) \quad (7)$$

The output of Step 1, namely any chosen data-driven technique, is our first-cut estimate of the probability distribution of the corresponding financial metric shown at 104.

In Step 2, we seek to further adjust the above resulting probability distribution using forward-looking risk elicitation that is done by experts in order to incorporate forward-looking risk factors that are over and above what has been experienced by the historical data set.

Future Looking Risk Elicitation with Experts

The above approaches are history driven. In one embodiment of the present disclosure, risk management need not be entirely predicated on historical data. One way to perform future-looking risk-adjustment is the use of expert opinion. In this approach, we poll experts (108a, 108b, ..., 108n) on their views on each individual element with respect to risk factors that may impact the forecasts of Revenue and Net Profit Margin.

The presentation below shows how to use the expert-opinion driven method to risk-adjust the nominal "As-is" estimate. The same procedure may be used to risk-adjust any starting estimate, say a nominal "As-is" estimate, or a first-cut probability distribution estimate (such as the triangular distribution resulting from Step 1 that is driven by historical data analysis).

For each "As-is" estimate of Revenue and Net Profit Margin, the risk elicitation is carried out using two sets of questionnaires, one on likelihood and another on severity of impact, for each risk factor. Likelihood captures the probability of realization of the risk factor, while severity of impact is a relative statement, in terms of incremental impact that is relative to the "As-is" estimate. Both these questions are answered by experts based on their beliefs, using a categorical scale that is often convenient for them. For example, the likelihood question is answered on a scale of {very high, high, medium, low, very low}. Similarly, the severity of impact is answered on a scale of {−5, −4, ..., −1, 0, +1, ..., +4, +5}, where the positive sign denotes an impact in the upward direction (favorable), and the negative sign denotes an impact in the downward direction (adverse) relative to the proposed financial plan, and 0 denotes the case of no impact.

Each risk factor is assumed to realize itself in exclusively one of multiple severity levels. There can be any number of levels with the exception that one of the levels is the default level, i.e. the level, L0, which leads to no (zero) impact on the "As-is" estimate. This default level captures the probability that the "As-is" estimate will be realized with no impact. Table 1 illustrates a survey result on two risk factors.

TABLE 1

An Example Survey Result of Expert Risk Elicitation

| Risk Factor | Description | Levels | Likelihood | Severity |
|---|---|---|---|---|
| 1 | R1 | Default Level (L0) | Low | 0 |
|  |  | Level 1 (L1) | Medium | −1 |
|  |  | Level 2 (L2) | High | +2 |
| 2 | R2 | Default Level (L0) | Very Low | 0 |
|  |  | Level 1 (L1) | Very High | +3 |

TABLE 2

A Sample Likelihood and Severity Calibration

| Likelihood | Probability |
|---|---|
| Very High | 90% |
| High | 75% |
| Medium | 40% |
| Low | 10% |
| Very Low | 10% |

| Severity | Relative Magnitude Impact |
|---|---|
| +1 | +10% |
| −1 | −10% |
| +2 | +15% |
| −2 | −15% |
| +3 | +20% |
| −3 | −20% |
| +4 | +25% |
| −4 | −25% |
| +5 | +30% |
| −5 | −30% |

The expert also calibrates the categorical scales onto numerical scales. A sample calibration, such as Table 2 may be presented as a default to experts, who may revise it according to their beliefs for each risk factor. In Table 2, the severity calibration is in terms of a percentage impact, relative to the proposed financial plan estimate.

Let $RF_i = \{1, \ldots, N_i\}$ denote the index set of risk factors pertinent to the future-looking Revenue estimates of element, $i \in I$. Further, let $K_{i,j} = \{0, \ldots, M_{i,j}\}$ denote the index set of various levels corresponding to risk factor, $j \in RF_i$, where 0 denotes the default level. Let the corresponding numerical likelihoods using the calibration scale be denoted by $\tau_{i,j,k}$, $\forall k \in K_{i,j}$. Let the corresponding relative impacts be denoted by $\Lambda_{i,j,k}$, $\forall k \in K_{i,j}$. We normalize the likelihoods, $\tau_{i,j,k}$ so that they sum to unity. Taking all combinations of levels across all risk factors defines the space of possible realizations and generates a probability distribution of net impact that is aggregated over each combination. The number of such combinations is $(1+M_{i,1}) \times (1+M_{i,2}) \ldots \times (1+M_{i,N_i})$, where the default level, L0 is counted in addition to the $M_{i,j}$ levels corresponding to each risk factor, $j \in RF_i$. Let us denote the corresponding index set of all combinations of levels across all risk factors as, $$Y_i = \left\{1, \ldots, \prod_{j=1}^{N_i}(1+M_{i,j})\right\} \tag{8}$$

Note that each index $l \in Y_i$ corresponds to a specific combination of level-indices across risk factors, and let $l(j) \in K_{i,j}$ denote the level of risk factor, $j \in RF_i$, in the combination corresponding to index l.

Assuming independence among each pair of risk factors, the resulting probability distribution of net impact is then described by the set of pairs, $$\{(\pi_{i,l}^{net}, \Lambda_{i,l}^{net})\} \forall\, l \in Y_i \tag{9}$$

where, $$\pi_{i,l}^{net} = \prod_{j \in RF_i} \pi_{i,j,l(j)}$$

$$\Lambda_{i,l}^{net} = \prod_{j \in RF_i}(1 + \Lambda_{i,j,l(j)}) - 1$$

The corresponding risk-adjustment for Revenue of element i is given as the following discrete distribution.

$$\tilde{R}_{i,t} = \{(\pi_{i,l}^{net}, R_{i,t}(1+\Lambda_{i,l}^{net}))\} \forall l \in Y_i \tag{10}$$

A similar exercise as Equation (10) for Net Profit Margins will lead to a risk-adjusted net profit margin forecast, $\tilde{\rho}_{i,t}$, $\forall i \in I, t \in T$. The assumption of independence among various risk factors is motivated by the corresponding practical simplicity of the elicitation process. It may be relaxed by polling experts for conditional probability tables that account for dependencies across risk factors. While doing may increase the complexity of the elicitation process, it also may lead to more realistic risk estimation. Equation (10) above captures the expert-driven risk estimation in one embodiment.

In another embodiment, the expert-driven risk estimation may be determined as follows. The following description focuses on the opinion-driven step described above. The system and method of the present disclosure allow the user (e.g., the expert) to enumerate a set of risk factors for each financial metric time-profile projection, and respond to a set of questions that is linear in the number of risk factors. In one embodiment, the risk elicitation on each risk factor is done using two questions, one on likelihood and another on impact/severity. Both these questions are answered by the user, based on their expert beliefs, using a categorical, qualitative scale. For example, the likelihood of any given risk factor is answered by the user on a scale of {high, medium, low}. Similarly, the impact that could result from a given risk factor is answered by the user on a symmetric scale of {+/−1, +/−2, ..., +/−5}, where the positive sign implies an upside impact, and the negative sign implies a downside impact. Table 3 illustrates examples of likelihood of risk and impact and/or severity scales. The user also has the option to calibrate these qualitative scores like H/M/L onto quantitative, numerical equivalents, or accept default values suggested by the system and method of the present disclosure. The default values are a starting point for calibrating opinion on a numerical scale. The user (expert) has the choice to update the calibration to be consistent with the elicitation they are providing. After the user has had an opportunity to answer the two questions, on each of the risk factors for any given nominal, financial projection estimate, the above inputs are systematically converted into a net impact distribution for that nominal, financial estimate.

TABLE 3

| Risk Factor | Risk Factors (Beneficial & Adverse) | Likelihood, on a categorical scale, say, {High, Medium, Low} | Severity, on a categorical scale, say, {−5, −4, −3, −2, −1, +1, +2, +3, +4, +5} |
|---|---|---|---|
| 1 | Insufficient Bandwidth in Channel to Market | Medium | −3 |
| 2 | Upswing in customer interest in proposed solution, due to XYZ... | Medium | +3 |
| 3 | Technical performance of proposed solution | Low | −4 |
| ... | ... | ... | ... |

The user can think about the risk to the business case, by breaking it down into risk factors, which the user defines, and is comfortable with. Further, a user can do this for each of the financial metric projections that are believed to be at risk.

The user answers a number of questions which is linear in the number of risk factors, along a qualitative, categorical scale for both likelihood and severity, and further, calibrate their model of how high is high, or how low is low, by accepting and/or modifying default numerical equivalents suggested by the system and method of the present disclosure for these categorical inputs the user puts down.

The system and method of the present disclosure then develop the impact to each of the corresponding nominal, deterministic, financial estimates, in the form of probability distributions, which can then drive the risk-adjusted portfolio analysis of the corresponding set of business cases.

The user is no longer required to put down or specify a net risk score metric for the whole business case, or directly put down probability distributions for the proposal's financial projections. This circumvents the impediment to effective risk-adjusted portfolio analysis, which often occurs in practice.

For each financial metric, e.g., revenue, in each business case, expert input is obtained in the following format: user defined set of independent risk facts; likelihood can be in any categorical scale, e.g., {high, medium, low} or {1, 2, 3, 4, 5}. For example, we choose {H, M, L}; severity is in a categorical scale that allows both beneficial (positive), relative impact, and adverse (negative) relative impact. For example, we choose {−5, −4, . . . , −1, +1, +2, . . . +5}

The categorical scale is mapped into a numerical scale. For likelihood, this mapping converts the categorical scale into a probability scale. For severity, this mapping converts the categorical scale into a relative (percentage) impact, which is relative to the nominal magnitude, which is the subject of risk estimation. The mapping is calibrated by an expert. The calibration tells what the expert means by high or low. For example, likelihood factor of "high" may have probability of 0.75. Likelihood factor "medium" may have probability of 0.4. Likelihood factor "low" may have probability of 0.15.

Figure 2:
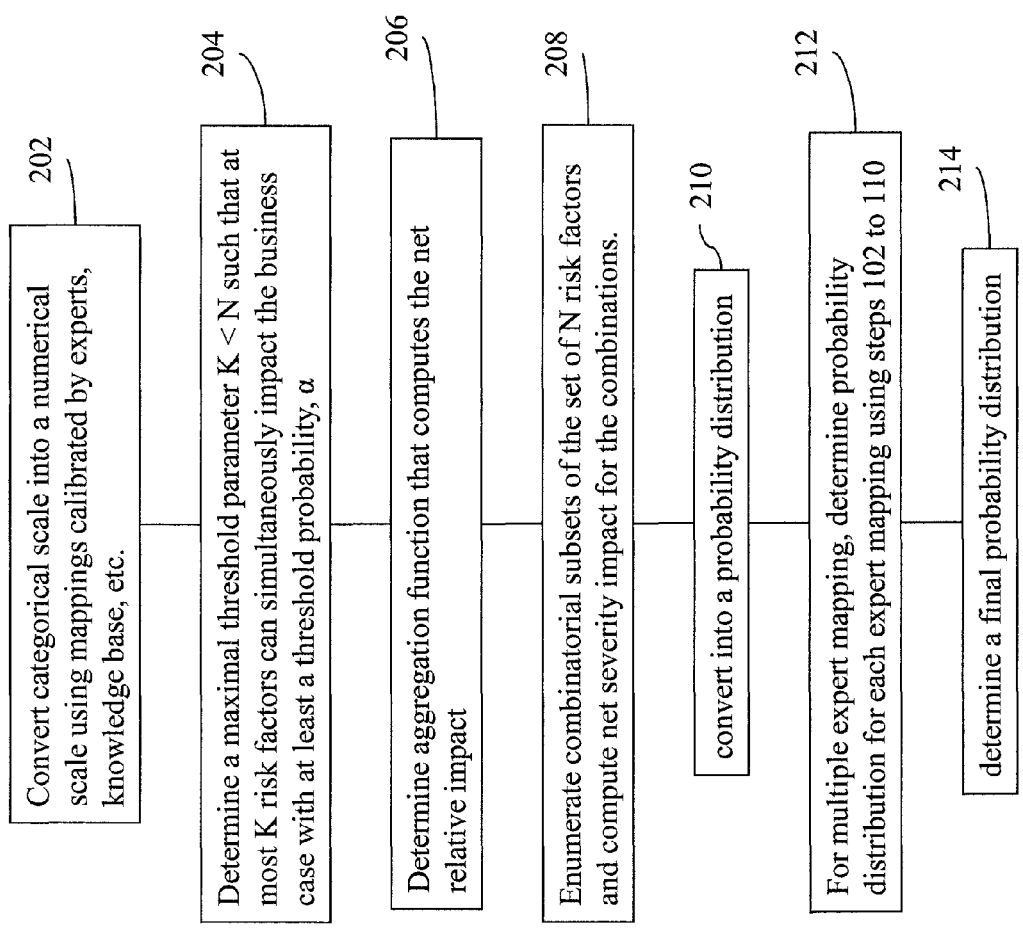
FIG. 2 is a flow diagram illustrating a method of the present disclosure in one embodiment that includes expert-opinion techniques without the data driven approach.

FIG. 2 is a flow diagram illustrating a method of the present disclosure in one embodiment. At 202, a mapping from the categorical scale into a numerical scale is used to convert user input. For example, for likelihood of risk input, this mapping converts the categorical scale into a probability scale. For severity input, this mapping converts the categorical scale into a relative (percentage) impact, which is relative to the nominal magnitude, which is the subject of risk estimation. The mapping is calibrated, for example, by an expert or like or an expert or database system automatically. For instance, what does the expert have in mind when they say High, or Low? A sample mapping that is calibrated by the expert is shown in Table 4 and Table 5.

TABLE 4

| Likelihood | Probability |
|---|---|
| High | 0.75 |
| Medium | 0.4 |
| Low | 0.15 |

TABLE 5

| Severity | Relative Magnitude Impact (percentage) |
|---|---|
| +1/−1 | +10%/−10% |
| +2/−2 | +15%/−15% |
| +3/−3 | +20%/−20% |
| +4/−4 | +25%/−25% |
| +5/−5 | +30%/−30% |

Table 6 shows examples of input likelihood and severity, and Table 7 shows the mapped input values into corresponding probability and relative impact respectively. That is, likelihood is converted to probability value and severity is converted to relative impact.

TABLE 6

| Risk Factor | Risk Factors (Beneficial & Adverse) | Likelihood, on a categorical scale, say, {High, Medium, Low} | Severity, on a categorical scale, say, {−5, −4, −3, −2, −1, +1, +2, +3, +4, +5} |
|---|---|---|---|
| 1 | R1 | High | −3 |
| 2 | R2 | Medium | +2 |
| 3 | R3 | Low | −4 |
| ... | ... | ... | ... |

TABLE 7

| Risk Factor | Risk Factors (Beneficial & Adverse) | Probability | Relative Impact (percentage) |
|---|---|---|---|
| 1 | R1 | $p_1$ | $\Delta_1$ |
| 2 | R2 | $p_2$ | $\Delta_2$ |
| 3 | R3 | $p_3$ | $\Delta_3$ |
| ... | ... | ... | ... |

Depending on the nature of the risk factor, the relative impact may be positive or negative values.

Consider N risk factors {1, 2, . . . N}, corresponding probability values {p1, p2, . . . pn}, corresponding relative impacts {D1, D2, . . . , Dn}. At step 204, a maximal threshold parameter K<N is determined such that at most K risk factors can simultaneously impact the business case with at least a threshold probability, α. This may be determined as shown in FIG. 3:

At step 206, the aggregation function computes the net relative impact (net severity), arising from a simultaneous consideration of say, M, risk factors, $1 \leq M \leq K$. Net relative impact is a net percentage impact on a given estimate (which may be a nominal "As-is" deterministic estimate, or say, a probability distribution such as the triangular distribution that results from Step 1, i.e., the output of the historical data driven analysis), due to the simultaneous set of I individual risk factors, and their corresponding relative (percentage) impacts as shown in FIG. 4.

Below, the symbol, I, is used to refer to risk factors in the set $\{1, 2, \ldots, N\}$ of risk factors. At step 208, set of all $\{N\text{-}C\text{-}I\}_{I=0, 1, 2, \ldots, K}$ combinatorial subsets of the set of N risk factors is enumerated. This is N-choose-I, i.e., all possible ways to choose I items from N items. This is done for all values for I=0, 1, . . . , K. K is the parameter such that K=MaxI s.t.

$I \in \{1, 2, \ldots, N\}$ $$\text{Max}\left((i_1, i_2, i_3 \ldots i_I) \in N_I \prod_{k=1}^{I} p_{i_k}\right) \geq \alpha$$

where $N_I$ is the set of all subsets of cardinality I, of the set $\{1, 2, \ldots, N\}$ The net severity impact of any single combination is computed using the aggregation function determined at step 206. The likelihood of any single combination can be computed as the product of the component likelihood for independent risk factors. Table 8 shows the risk factor combinations. Table 8 shows the list of all combinations, N-Choose-I, where I varies taking all values, I=0, 1, . . . , K. This is the combinatorial enumeration described in Step 208. For each combination, the aggregate likelihood and impact is computed, as described in Step 206.

TABLE 8

| Index | Risk Factor Combinations | Net Probability | Net Severity (Relative Impact) |
|---|---|---|---|
| 1 | { } | ... | ... |
| 2 | {1} | ... | ... |
| ... | {1, 3, 8} | ... | ... |
| ... | {2, 7, 9} | ... | ... |
| ... | ... | ... | ... |
| ... | ... | ... | ... |
| $\sum_{I=0}^{K} {}^{N}C_I$ | {N − K + 1, . . . N} | ... | ... |

At step 210, the computed values from step 208 are converted into a probability distribution. There are many variants to this step. One variant includes converting it to a triangular distribution in the manner shown in FIG. 5. FIG. 5 shows the risk-adjusted probability distribution of net (relative) impact arising purely from the expert-opinion step. The triangular distribution may be interpreted as follows. This net impact (in the form of a probability distribution) may be understood to be 'relative' to the output of the historical data-driven analysis step. (See explanation below).

The expert-opinion data set captures elicitation of expert opinion in terms of the risk factors that need to be considered over and above what is already implicit in the historical data-driven analysis. Each such forward-looking risk factor (that is over and above the set of historically witnessed risk factors) is captured in terms of likelihood of occurrence and severity of impact, for instance, expressed relative to the risk-adjusted distribution resulting from the historical data-driven analysis. If no historical data-driven analysis is performed, then the severity of impact may be expressed relative to the nominal (deterministic) "As-is" estimate of the financial metric under question, e.g., Revenue or Profit.

At step 212, if there are inputs from multiple experts, each expert's input is translated into a probability distribution using steps 202 to 210. The corresponding net (relative) impacts (in the form of probability distributions) from multiple experts may then be combined using a weighted combination, where each weight reflects the importance of each expert. If all experts are equivalent, a uniform weighting can be used, thereby resulting in a plain averaging of the net (relative) impact probability distributions corresponding to the set of experts.

At step 214, all probability distributions corresponding to the same metric, for example, revenue of a given business case, are combined to determine a final probability distribution for that metric. For example, the weighted combination across multiple experts (see above) results in single net (relative) probability distribution of impact, which is relative to the output of the historical data-driven analysis. If no historical data-driven analysis is performed, then the severity of impact is expressed relative to the nominal (deterministic) estimate of the financial metric under question, e.g., Revenue or Profit. The final probability distribution of the financial metric under question, e.g., Revenue or Profit, i.e., the final risk-adjusted probability distribution is obtained by combining the historical data-driven analysis output, and the above weighted net (relative) probability distribution of impact attributable to expert, forward-looking factors.

This combination may be done as follows:

$$R_{i,t,Final} = R_{i,t} * \left(1 + \sum_{j=1}^{m} w^j (\Delta_{i,final}^j)\right),$$

where, $R_{i,t}$ comes from Equation (3) or (6), for example. This is the output of the historical data-driven step (if performed). Else this is the nominal estimate, $R_{i,t}$ $w^j$ is the normalized weight of the j-th expert (out of say, m experts), i.e.

$$\sum_{j=1}^{m} w^j = 1$$

and the net (relative) final impact arising from the j-th expert's elicitation is modeled as:

$$\Delta_i^{j,final} = \text{Triangular}(a^j, b^j, c_j), \text{where:}$$

$$\text{Triangular Min: } a^j = \text{Min}_{i \in \{1,2,\ldots \sum_{I=0}^{K^j} N_{C_I}\}} \left(\Delta_i^{NET,j}\right)$$

$$\text{Triangular Max: } c^j = \text{Max}_{i \in \{1,2,\ldots \sum_{I=0}^{K^j} N_{C_I}\}} \left(\Delta_i^{NET,j}\right)$$

$$\text{Triangular Centre, } b^j = \frac{\sum_{i=1}^{\sum_{I=0}^{K^j} N_{C_I}} p_i^{NET,j} * \Delta_i^{NET,j}}{\sum_{i=1}^{\sum_{I=0}^{K^j} N_{C_I}} p_i^{NET,j}}$$

In the above equations, a superscript, j denotes calculations pertinent to the j-th expert. All else is identical to FIG. 5.

The final probability distribution may be used to drive portfolio risk quantification and risk-adjusted portfolio optimization.

The data-driven and expert-opinion driven risk estimation methods disclosed above may be employed individually or in combination. Further, the specific techniques disclosed for each of the data-driven and expert-opinion driven risk estimation method may be employed in any combination. For example, only data-driven method may be used, or only expert-opinion driven method may be used. Yet in another aspect, both the data-driven and expert-opinion driven methods may be employed. Further more, either one of the techniques (i.e., using plan-versus-actual historical revenue data, or using plan-versus-actual historical revenue data and market opportunity data) in the data-driven method may be utilized. Similarly, either one of the approaches (i.e., using all combinations of risk factors shown in equation (10), or combinations of K risk factors as shown in FIG. 5) for capturing expert-opinion driven risk estimation may be employed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
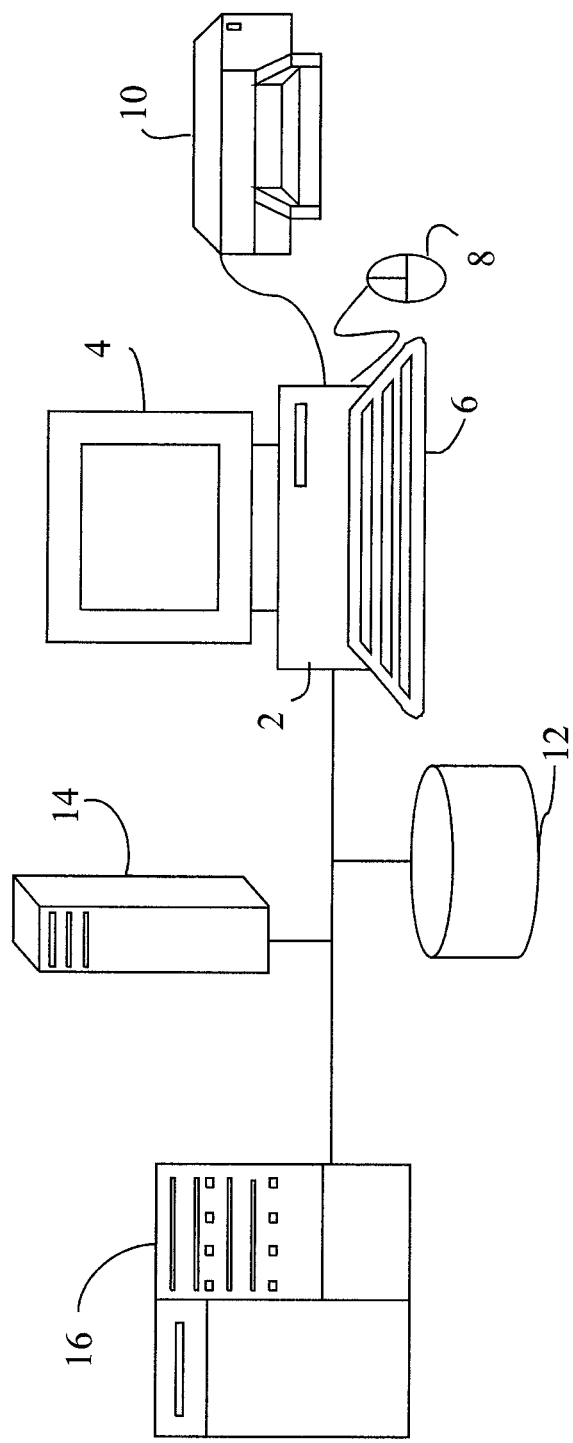
FIG. 6 illustrates an example computer system and network in which the systems and methodologies of the present disclosure may be carried out or executed.

Referring now to FIG. 6, the systems and methodologies of the present disclosure may be carried out or executed in a computer system 2 that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method of estimating risk in financial metrics of a business case, comprising:

categorizing each financial metric into a plurality of risk factors; receiving likelihood of risk associated with each risk factor in a first categorical scale;

receiving a severity associated with each risk factor in a second categorical scale;

converting said first categorical scale and said second categorical scale into a numerical scale using a mapping;

determining, by a processor, a maximal threshold parameter K that represents a maximum number of risk factors that simultaneously impact the business case with at least a threshold probability A;

determining, by the processor, combinatorial subsets of the K or less risk factors;

determining, by the processor, net severity impact for each of the combinatorial subsets based on the received severity associated with each risk factor in said each of the combinatorial subsets, wherein determining the net severity impact uses an aggregation function comprising $$\Delta(i_1, i_2, \ldots, i_I) = 1 - \left(\prod_{k=1}^{I}(1-\Delta_k)\right) \forall\, 1 < I \le K,$$

wherein K represents said maximum number, $(i_1, i_2, \ldots, i_I)$ represents one of the combinatorial subsets having cardinality I, and $\Delta_k$ represents the severity associated with a respective risk factor, $i_1, i_2, \ldots, i_I$ in the one of the combinatorial subsets;

determining, by the processor, a likelihood of risk for each of the combinatorial subsets based on the received likelihood of risk associated with each risk factor in a respective one of the combinatorial subsets; and converting, by the processor, the net severity impact for each of the combinatorial subsets and the likelihood of risk for the combinatorial subsets into a probability distribution.

2. The method of claim 1, wherein the step of converting said first catergorial Scale includes converting said first categorical scale into a probability scale.

3. The method of claim 1, wherein the step of converting said second categorical scale includes converting said second categorical scale into a percentage impact relative to a nominal magnitude of an associated risk factor.

4. The method of claim 1, wherein the mapping is calibrated by a plurality of experts.

5. The method of claim 4, wherein the steps are repeated for each of the plurality of experts, and the probability distribution corresponding to each expert is combined using a weighted value for each expert.

* * * * *